United States Patent [19]

Kamo

[11] Patent Number: 5,154,142
[45] Date of Patent: Oct. 13, 1992

[54] IONIC COMBUSTION SYSTEM WITH IGNITOR ASSIST

[75] Inventor: Roy K. Kamo, Columbus, Ind.

[73] Assignee: Adiabatics, Inc., Columbus, Ind.

[21] Appl. No.: 855,261

[22] Filed: Mar. 23, 1992

[51] Int. Cl.$^5$ ............................................. F02B 47/02
[52] U.S. Cl. ................................. 123/25 F; 123/1 A; 123/536; 123/25 B
[58] Field of Search ................ 123/25 R, 25 B, 25 D, 123/25 E, 25 F, 1 A, 538, 536, 537, 23

[56] References Cited

U.S. PATENT DOCUMENTS

| | | | |
|---|---|---|---|
| 3,717,129 | 2/1973 | Fox | 123/1 A |
| 4,355,969 | 10/1982 | Nelson | 123/536 |
| 4,368,711 | 1/1983 | Allen | 123/25 B |
| 4,463,708 | 8/1984 | Gerry | 123/25 B |
| 4,469,076 | 9/1984 | Wolff | 123/536 |
| 4,538,582 | 9/1985 | Wakata | 123/536 |
| 4,552,106 | 11/1985 | Spence | 123/25 D |
| 5,012,772 | 5/1991 | Nakamura | 123/25 D |
| 5,076,246 | 12/1991 | Onyszczuk | 123/538 |

Primary Examiner—E. Rollins Cross
Assistant Examiner—Erick Solis
Attorney, Agent, or Firm—Baker & Daniels

[57] ABSTRACT

An ionic combustion system for a heat engine having a combustion chamber. A fuel source and water source are provided. An agitating chamber in fluid communication with the water source has an agitator and at least one magnetizing source for agitating and ionizing the water. The water is combined with fuel and communicated to a prechamber having a plurality of ignition assist rods adapted to heat the ionized water and fuel and water prior to combustion.

24 Claims, 8 Drawing Sheets

IONIC COMBUSTION SYSTEM WITH IGNITOR ASSIST

FIELD OF THE INVENTION

The present invention relates to a heat piston engine and, more particularly, to a system and method for providing ionized water and fuel to a heat engine.

BACKGROUND OF THE INVENTION

Systems to increase fuel efficiency and decrease pollutant emissions from a heat engine, and more particularly an internal combustion engine, are known in the art. For example, U.S. Pat. No. 3,717,129 to Fox discloses a method and apparatus for steam reforming a fuel for an internal combustion engine. A water and fuel mixture is passed through a catalytic converter where the mixture is heated by exhaust gases from the internal combustion engine. The water in the water and fuel mixture, aided by a catalyst, is converted into steam which reforms the fuel, thereby producing a reformed fuel with decreased pollutant properties when combusted.

Other systems employing application of a magnetic field to a fuel are also known. For example, U.S. Pat. Nos. 4,538,582 to Wakuta and 4,469,076 to Wolff both disclose systems for applying a magnetic field to a fuel flowing into a combustion chamber of an internal combustion engine. The magnetic field is believed to reduce the surface tension of the fuel and thereby increase fuel oxidation.

Systems for increasing the efficiency of a heat engine by providing an ionized fuel and water mixture to the combustion chamber are also known in the art. U.S. Pat. No. 4,355,969 to Nelson, et al. discloses a method of ionizing water and mixing the water with a fuel to form an emulsion which is introduced into a combustion chamber. The water is ionized prior to mixing with the fuel in an ionizer having a pair of electrically charged plates. A high voltage power supply operating at a voltage between 3 to 9 KV maintains the electrical charge in the plates for ionization of the water. Thus, the Nelson patent requires a high voltage to effect ionization of the water.

It is also known to provide an internal combustion engine with ignitor assist rods to assist in more rapid combustion of introduced fuel.

What is needed in the art is a system and method for reliably and inexpensively providing an ionized fuel and water mixture to a combustion chamber and enhancing the physical properties of the ionized water and fuel mixture in the combustion chamber prior to combustion.

SUMMARY OF THE INVENTION

The present invention provides an agitating chamber for ionizing a water and/or fuel and water mixture which is in fluid communication with a pre-chamber having a plurality of ignition assist rods for heating the ionized mixture prior to combustion.

The agitating chamber may be adapted to receive the fuel and water as a slurry, to receive the fuel and water separately, or to receive water only. A rotating impeller agitates the fuel and/or water in the agitating chamber to cause fuel and/or water molecules to move past a plurality of permanent magnets disposed within the agitating chamber. The pre-chamber receives ionized fuel and/or water from the agitating chamber and quickly heats the ionized fuel and/or water mixture with a plurality of ignition assist rods prior to combustion.

Accordingly, the invention comprises, in one form, an ionic combustion system for an internal combustion engine. A fuel source and water source are provided. An agitating chamber in fluid communication with the fuel source and the water source has an agitator and at least one magnetizing source for respectively agitating and ionizing a fuel and water mixture. A pre-chamber in fluid communication with the agitating chamber and the combustion chamber has a plurality of ignition assist rods adapted to heat the ionized fuel and water therein prior to combustion.

The invention comprises, in another form thereof, an ionic combustion system for an internal combustion engine. A fuel source and a water source are provided. An agitating chamber has a first inlet adapted to receive fuel from the fuel source, a said second inlet adapted to receive water from the water source, and an outlet. The agitating chamber further includes an agitator for mixing the fuel and water in the agitating chamber and at least one magnetic field source adapted to ionize the fuel and water mixture. The magnetic field source may be provided by a permanent magnetic or electromagnet affixed to either the interior or exterior of the chamber. A pre-chamber has an inlet in fluid communication with the agitating chamber outlet and an outlet in fluid communication with the combustion chamber. The pre-chamber includes a plurality of ignition assist rods for heating the ionized fuel and water mixture.

An advantage of the present invention is that the water and/or water and fuel mixture is both ionized and heated prior to combustion, thereby increasing fuel efficiency and decreasing pollutant emissions, including hydrocarbons, carbon dioxide and smoke.

Another advantage is that faster combustion, a higher heat release rate, higher peak pressure, and greater expansion of internal energy are achieved.

Yet another advantage is that a combustion process having a shorter ignition delay period is achieved.

A still further advantage is that the agitating impeller ensures adequate fluid flow past the permanent magnets and resultant ionization.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DETAILED DESCRIPTION OF THE INVENTION

Figure 1:
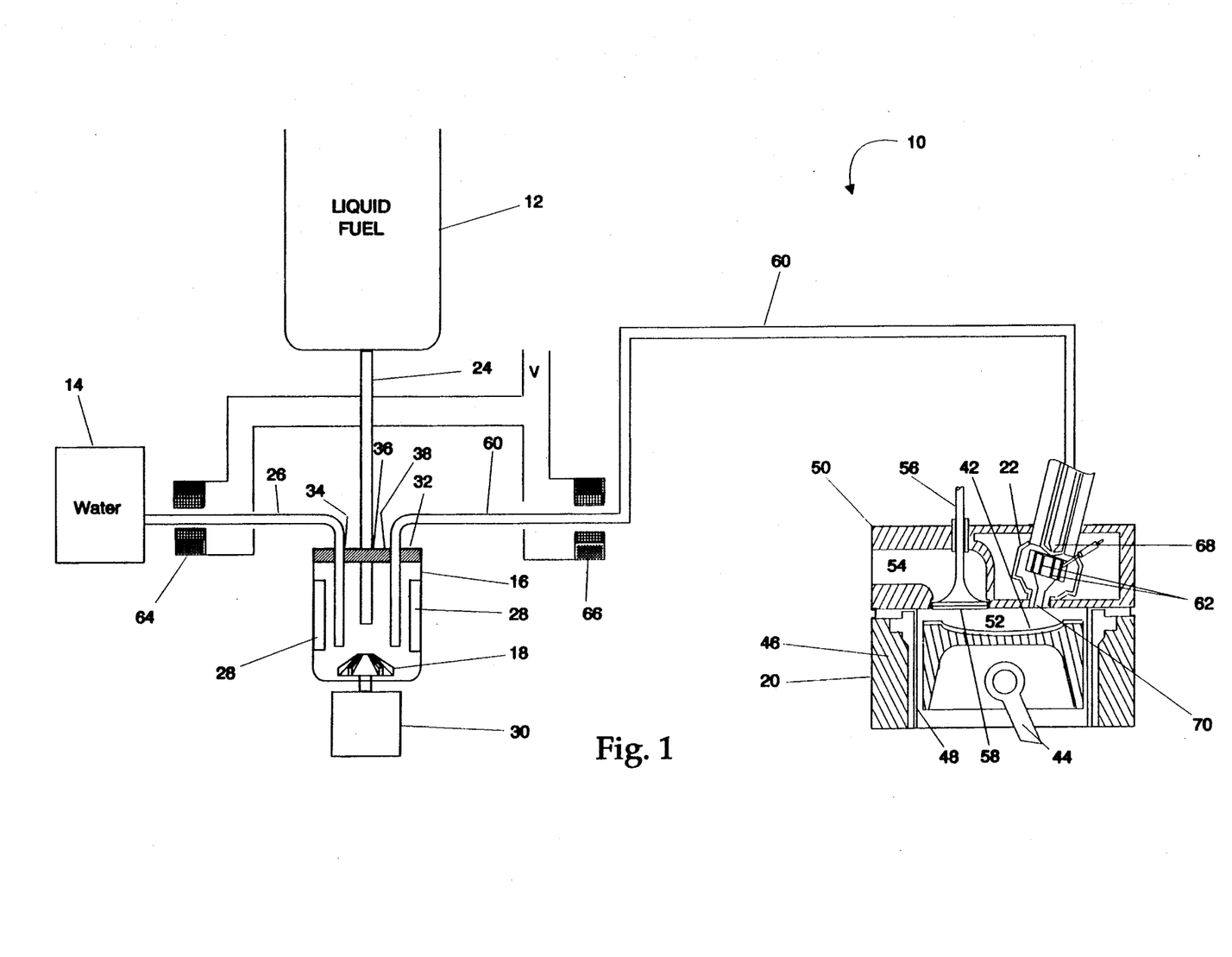
FIG. 1 illustrates an ionic combustion system having a liquid fuel source and a water source in fluid communication with an agitating chamber.

Referring now the drawings and particularly to FIG. 1, there is shown one embodiment of the present invention. In general, ionic combustion system 10 includes a liquid fuel source 12 having liquid fuel therein, a water source 14 having water therein, an agitating chamber 16 having an agitator 18, and a heat engine 20 having a pre-chamber 22.

More particularly, liquid fuel source 12 has therein a combustible liquid fuel, such as gasoline or diesel fuel, and is in fluid communication with agitating chamber 16 via a conduit means 24. Water source 14 includes therein water which is transported into agitating chamber 16 via conduit means 26.

In the embodiment shown in FIG. 1, fuel in liquid fuel source 12 and water in water source 14 are urged by gravitational force through conduits 24 and 26 respectively and into agitating chamber 16. In an alternative embodiment, liquid fuel source 12 and water source 14 may be pressurized to further aid in transporting liquid fuel and water respectively into agitating chamber 16. Moreover, liquid fuel source 12 and water source 14 may include, as is known in the art, metering or valving apparatus to control the flow rate of liquid fuel to agitating chamber 16.

Agitating chamber 16 is adapted to mix and ionize liquid fuel and water supplied by liquid fuel source 12 and water source 14. Accordingly, agitating chamber 16 includes an agitator 18 which is connected to and rotatably driven by an electric motor 30. In the embodiment shown, agitator 18 is an impeller which imparts rotary motion to the liquid fuel and water within agitating chamber 16. A pair of permanent magnets 28 are provided to ionize the fuel and water mixture within agitating chamber 16 and thereby improve the combustion of the fuel and water mixture within heat engine 20. Alternatively, the magnetic field may be provided by a permanent or electro magnet located either outside or inside the agitating chamber. A different number of permanent magnets, e.g., 1, 3 or 4 may also be employed to effectively carry out ionization of the fuel and water mixture. A lid member 32 is provided to prevent spillage of the liquid and fuel mixture during the agitation within agitating chamber 16 and is formed with first and second inlets 34 and 36 for respectively receiving conduit mens 24 and 26, and an outlet 38 for receiving conduit means 40. Alternatively, impeller 18 may be connecting to a belt-driven pulley powered by any of a number rotary apparatus on the engine.

Heat engine 20, such as an internal combustion engine, is of the type known in the art. Heat engine 20 includes a piston 42 having a piston rod 44 hingably connected thereto. Piston 42 is slidably carried within cylinder 46 having a cylinder lining 48. Fixed at the upper end of cylinder 46 is a cylinder head 50 which coacts with piston 42 and cylinder 46 to form combustion chamber 52 which volumetrically changes depending on the axial, position of piston 42 within cylinder 46.

An exhaust manifold 54 is formed within cylinder head 50 for exhausting combusted fuel and water from combustion chamber 52. Valve means 56 is slidably carried within cylinder head 50 and has a generally planar surface 58 forms a portion of combustion chamber 52. Valve means 56, as is known in the art, acts to allow exhaust gas to be expelled from combustion chamber 52 during a pre-determined period of the combustion process.

Formed within cylinder head 50 and supplying an ionized fuel and water mixture to combustion chamber 52 is a prechamber 22 which is in fluid communication with outlet 38 of agitating chamber 16 via a conduit means 60. Prechamber 22 includes a plurality of ignitor assist means, such as, ignition assist rods 62, for further enhancing the combustion of the fuel and water mixture within combustion chamber 52. Ignition assist rods 62 are formed from a material capable of receiving heat from the combustion of the fuel and water mixture within combustion chamber 52 and transferring the heat to the fuel and water mixture passing through prechamber 22. In the embodiment shown, ignition assist rods 62 are formed from tungsten but could be formed from any other suitable material known in the art.

To further assist ionization of the water and water and fuel mixture, electro-magnets 64 and 66 are provided. Electro-magnets 64 and 66 may be connected in series, as shown in FIG. 1, with a voltage differential (V) applied to the circuit. Electro-magnet 64 is disposed around the circumference of conduit means 26 and operates to assist ionization of water transported through conduit means 26 to agitating chamber 16. Similarly, electro-magnet 66 is disposed around the circumference of conduit means 60 and operates to further ionize the fuel and water mixture transported from agitating chamber 16 to prechamber 22 via conduit means 60.

During operation, liquid fuel and water are transported respectively from liquid fuel source 12 and water source 14 into agitating chamber 16. A portion of the water passing through conduit means 26 from the water source 14 to the agitating chamber 16 is ionized by electromagnet 64. Rotating impeller 18 acts to mix the fuel and water mixture within agitating chamber 16 and further acts to radially displace the fuel and water mixture towards the permanent magnets 28. Permanent magnets 28 function to further ionize the fuel and water mixture within agitating chamber 16. The mixed and ionized fuel and water is transported through the agitating chamber outlet 38 via a conduit means 62 to inlet 68 of prechamber 22. Electromagnet 66 functions to further ionize the fuel and water mixture passing through conduit means 60. The mixture passing through prechamber 22 flows past a plurality of hot ignition assist rods 62 and is heated and ignited thereby. The heated and ignited fuel and water mixture is then transported through the prechamber outlet 70 and into main combustion chamber 52. Simultaneously, air is transported into the combustion chamber through an intake manifold and intake valve means (not shown). The fuel and water mixture is then combusted within combustion chamber 52 and thereby forces piston 42 to move downward away from cylinder head 50. Exhaust valve means 56 is operated and moves downward allowing the combusted exhaust gas to be transported through the exhaust manifold 54 to the environment.

Figure 2:
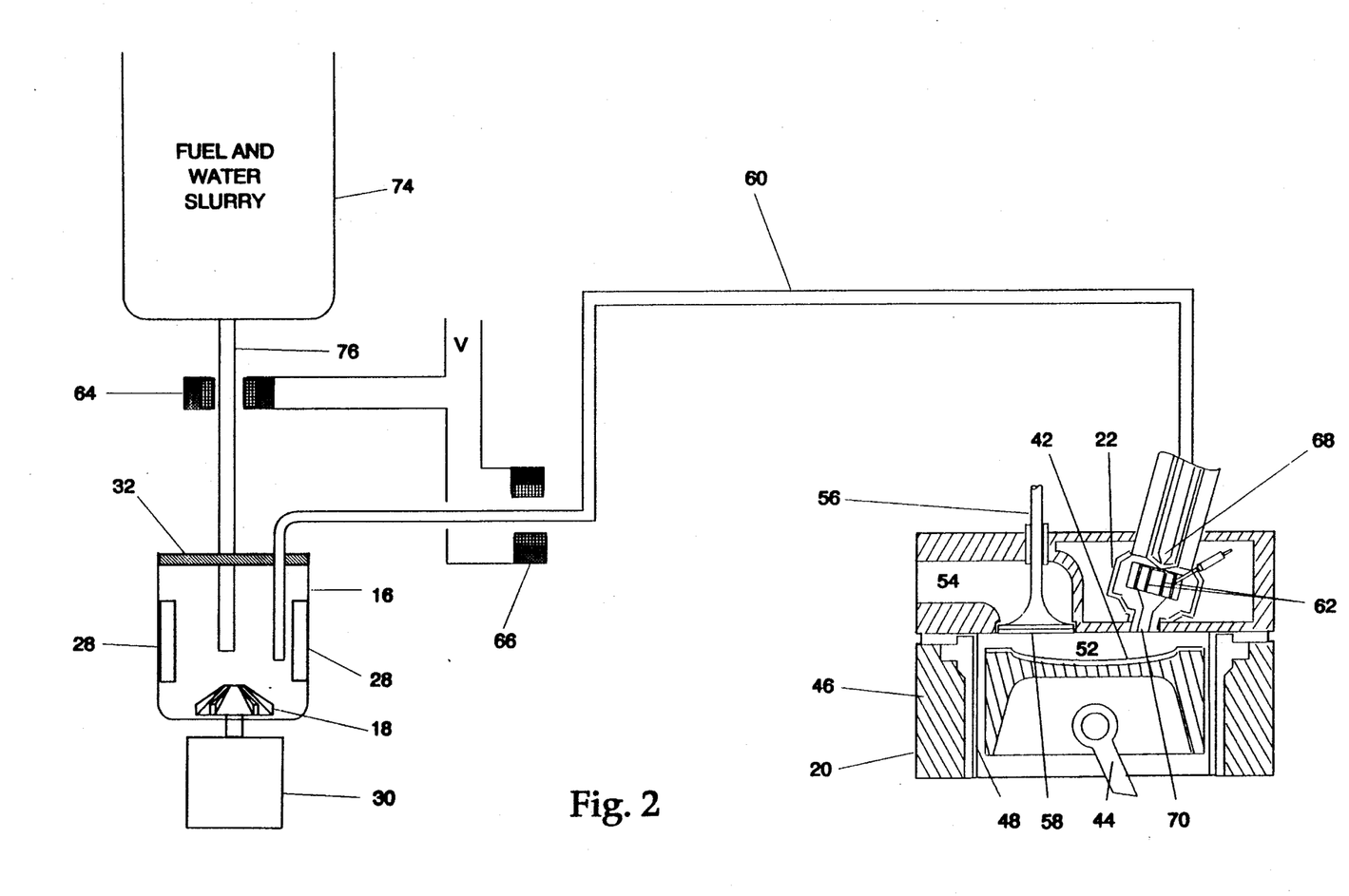
FIG. 2 shows an ionic combustion system having a fuel source with a slurried fuel and water mixture therein which is in fluid communication with an agitating chamber.

FIG. 2 illustrates an embodiment of the present invention wherein a fuel and water slurry may be supplied to the agitating chamber 16. The fuel is typically a solid fuel, such as coal, which is ground into a fine powder and mixed with water to form a fuel and water slurry. In the embodiment shown, a slurried fuel and water source 74 has a fuel and water slurry therein which is transported to the agitating chamber 16 via conduit means 76. An electromagnet 64 is disposed around the circumference of conduit means 76 and functions to partially ionize the fuel and water slurry transported through conduit means 76.

Figure 3:
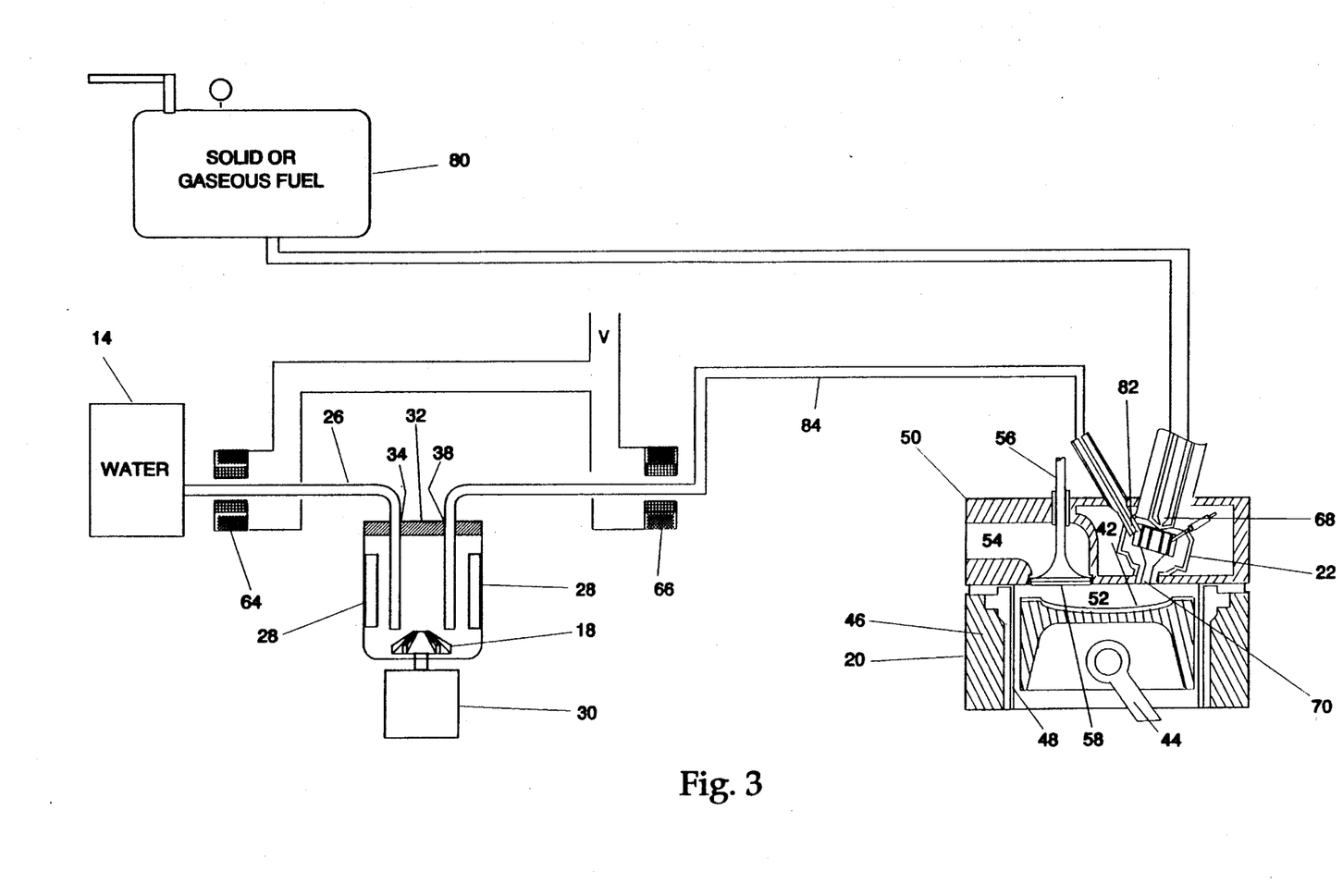
FIG. 3 depicts an ionic combustion system having a gaseous or solid fuel source in communication with a pre-chamber and a water source in fluid communication with an agitating chamber.

FIG. 3 illustrates another embodiment of the invention wherein a gaseous or solid fuel source 80 directly supplies fuel to prechamber 22 where the fuel is simultaneously mixed with ionized water. Because the water is a better conductor than the fuel, the water may be ionized in agitating chamber 16 prior to mixing with the fuel in prechamber 22.

A water source 14 includes water therein which is transported via conduit means 26 to agitating chamber 16. Impeller 18 causes the water to be radially displaced towards permanent magnets 28 which ionize the water. Moreover, agitation by the water of impeller 18 assures that water molecules randomly pass close by permanent magnets 28 and are thereby ionized. The ionized water is transported via conduit means 84 to a second prechamber inlet 82 of prechamber 22 and is injected into prechamber 22. The solid or gaseous fuel is mixed with the ionized water within prechamber 22 and heated and ignited by the plurality of ignition assist rods 62 before being transported through prechamber outlet 70 and into combustion chamber 52 where the mixture is combusted.

Figure 4:
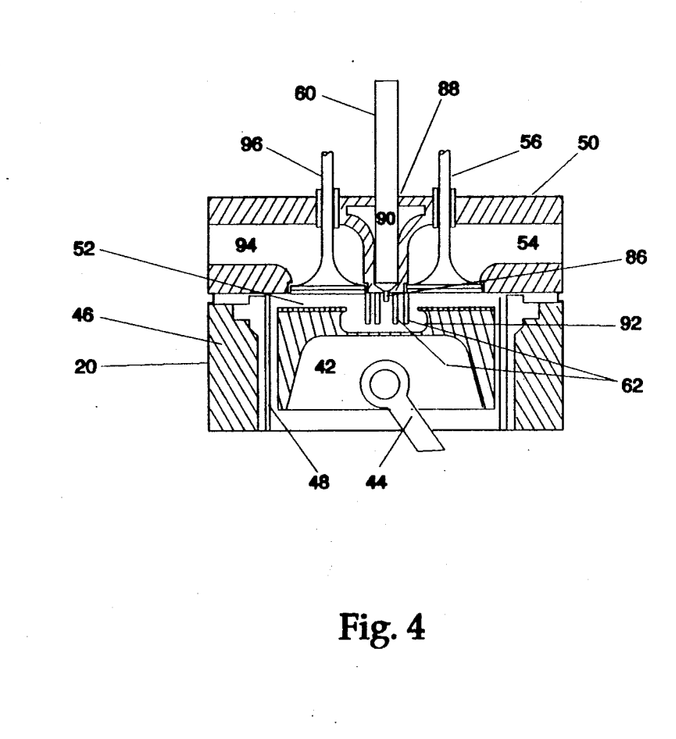
FIG. 4 shows an alternate embodiment of FIGS. 1-3 wherein the plurality of ignition assist rods are adapted to extend into the combustion chamber and a preformed recess in the piston.

FIG. 4 shows an alternative embodiment of the invention shown in FIGS. 1-3 wherein the ionized water and fuel mixture is injected directly into combustion chamber 52 (direct injection) and the plurality of ignition assist rods 62 extend into the direct injection combustion chamber 52. Cylinder head 50 is formed to define an injector port 86 and a cylinder head inlet 88. An ionized fuel and water mixture, such as shown in FIGS. 1 or 2, is transported through conduit means 60 to cylinder head inlet 88. The ionized mixture is transported through passageway 90 and injected through injector port 86 into the combustion chamber 52. Ignition assist rods 62 are disposed adjacent to injector port 86 and extend downwardly from the bottom surface of cylinder head 50. Piston 42 is formed with a recess 92 in the upper surface thereof such that ignition assist rods 62 extend into recess 92 when the piston 42 is at or about top dead center.

The embodiment shown in FIG. 4 operates as follows: an ionized fuel and water mixture is transported through conduit means 60 and passageway 90 to injector port 86. The ionized fuel and water mixture is injected into combustion chamber 52 and heated and ignited by the plurality of ignition assist rods 62 for further enhancing the combustion process. Intake valve means 96 is operated and moves downwardly into combustion chamber 52, thereby allowing intake air to flow through intake manifold 94 into combustion chamber 52 where the air is mixed with the heated and ionized fuel and water mixture. The heated and ionized fuel and water and air mixture is combusted within combustion chamber 52, thereby exerting downwardly force against piston 42 causing the piston to move away from top dead center. Exhaust valve means 56 is operated to move downwardly within combustion chamber 52 and the combusted exhaust gas is transported to exhaust manifold 54.

Figure 5:
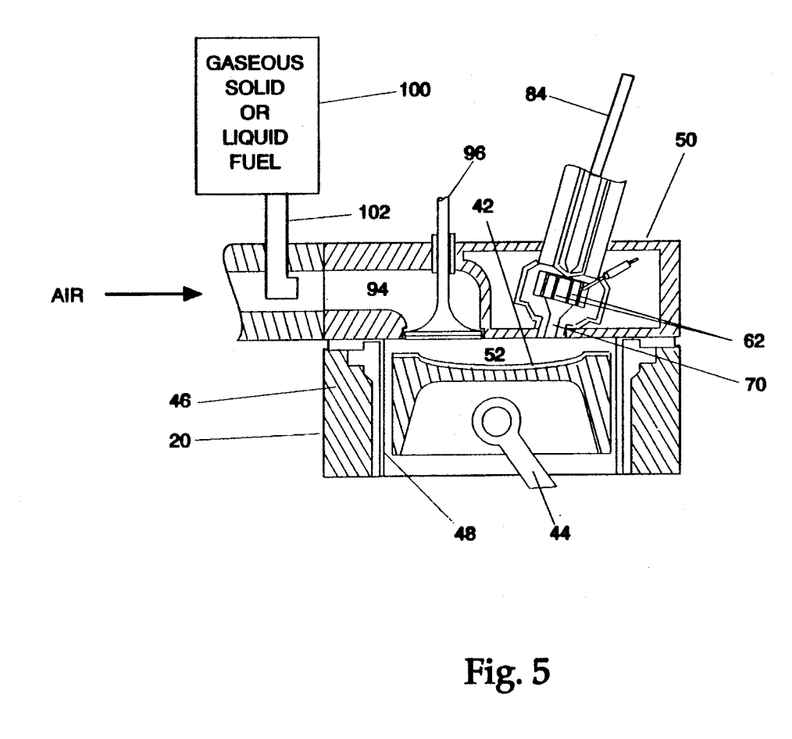
FIG. 5 is an alternate embodiment of FIGS. 1–3 wherein the ionized water is introduced into the pre-chamber and the fuel is introduced directly into the intake manifold.

FIG. 5 depicts an embodiment of the present invention wherein a fuel is injected into an intake manifold 94 and ionized water is transported into a prechamber 22. The fuel received from a fuel source 100 via conduit means 102 may be of a gaseous, solid or liquid type. The fuel is injected into the intake manifold, as is known in the art, and flows into combustion chamber 52 when intake valve means 96 is in a downward, open position. During the compression stroke of the piston, the fule is displaced into the prechamber 22. Injection timed ionized water is transported through conduit means 84 and into prechamber 22 where the ionized water and the fuel is heated and ignited by ignition assist rods 62. The heated and ionized water is then transported through prechamber outlet 70 and into combustion chamber 52 where it is mixed with fuel received through intake manifold 94. The ionized water, fuel and air mixture is combusted within combustion chamber 52 and expelled through an exhaust manifold (not shown).

Figure 6A:
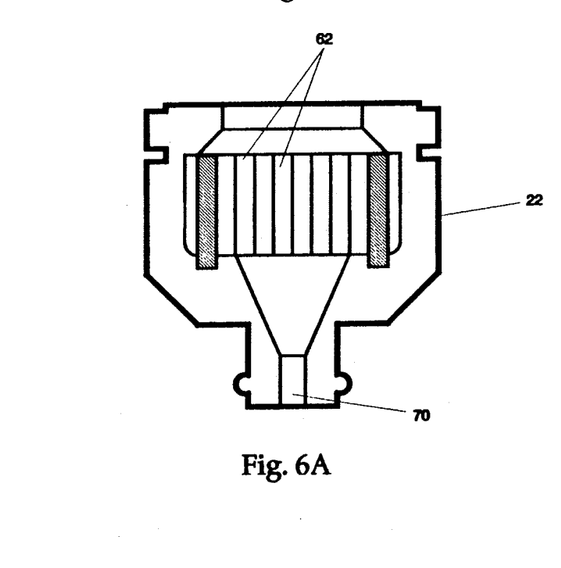
FIGS. 6A and 6B respectively show a side sectional view and a top view of an exemplary combustion chamber pre-chamber with a pin-rod type ignitor assist which may be used with the present invention.
Figure 6B:
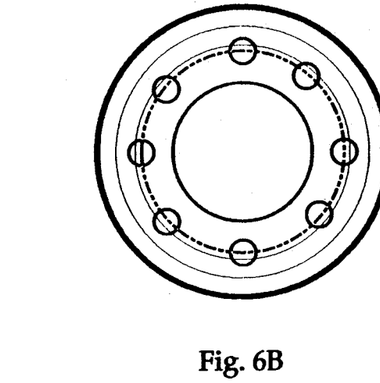

FIGS. 6A and 6B illustrate in greater detail a partial side view and top view of a prechamber 22 of the type which may be used with the present invention. Prechamber 22 has an ignitor assist comprising eight tungsten rods disposed therein for heating water or a fuel and water mixture which is subsequently injected into the combustion chamber 52. At the beginning of operation of heat engine 20, ignition assist rods 62 are at or about an ambient temperature. Prechamber 22 is disposed within cylinder head 50 such that prechamber outlet 70 is disposed at the bottom surface of cylinder head 50. Prechamber outlet 70 consists of an open passageway and therefore prechamber 22 is in fluid communication with combustion chamber 52. As fuel is combusted within combustion chamber 52, the heat caused by the combustion process increases the temperature of ignition assist rods 62 disposed within prechamber 22. After a certain amount of time, the ignition rods will achieve a steady-state operating temperature attributable to the heat of the combustion process. Fuel and/or water which is injected into prechamber 22 will flow past the plurality of ignition assist rods 62 and experience an increase in temperature due to heat transfer from the ignition assist rods 62 to the fluid. This increase in temperature, and the ionization of the water or fuel/water mixture, increases the combustion erfficiency of the fuel and decreases the ignition time and delay time during the combustion process. The heated fuel and/or water is subsequently injected into combustion chamber 52.

Figure 7A:
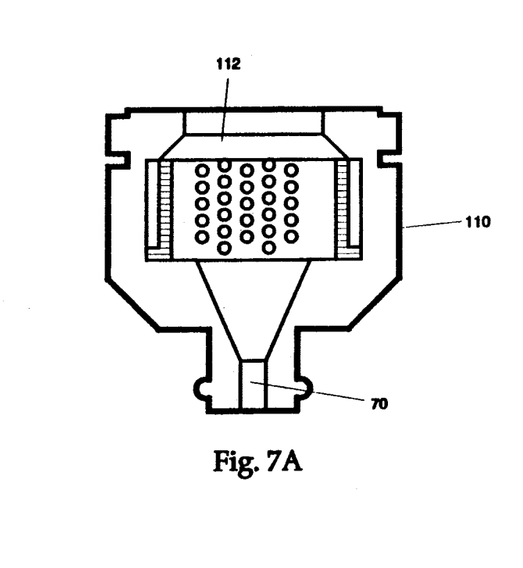
FIGS. 7A and 7B respectively show a side sectional view and a top view of an exemplary combustion chamber pre-chamber with a screen-type ignitor assist which may be used with the present invention.
Figure 7B:
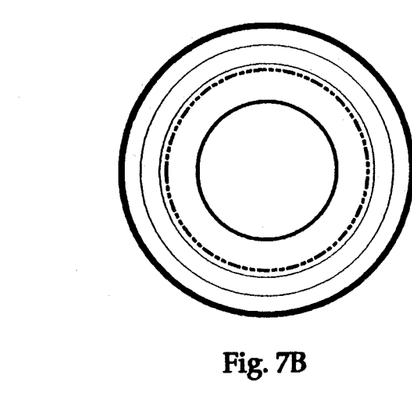

FIGS. 7A and 7B illustrate an alternative embodiment of the present invention in which prechamber 110 is provided with a screen type ignitor assist. The function of screen type ignitor assist shown in FIGS. 7A and 7B is similar to the function of the rod type ignitor assist shown in FIGS. 6A and 6B. In the embodiment shown, fine-mesh metal 112 includes a plurality of small holes through which the water and/or fuel passes prior to being injected into the combustion chamber 52. The water and/or fuel flows through fine-mesh metal screen 112 and is increased in temperature as a result of heat transfer between fine mesh metal screen 112 and the water and/or fuel.

It will be appreciated to those of skill in the art that many other forms of ignitor assist means may be employed in lieu of the rod and screen types disclosed above, provided such ignitor assist means has the ability to store sufficient heat to assist in the ignition of the ionized water and fuel mixture.

Figure 8:
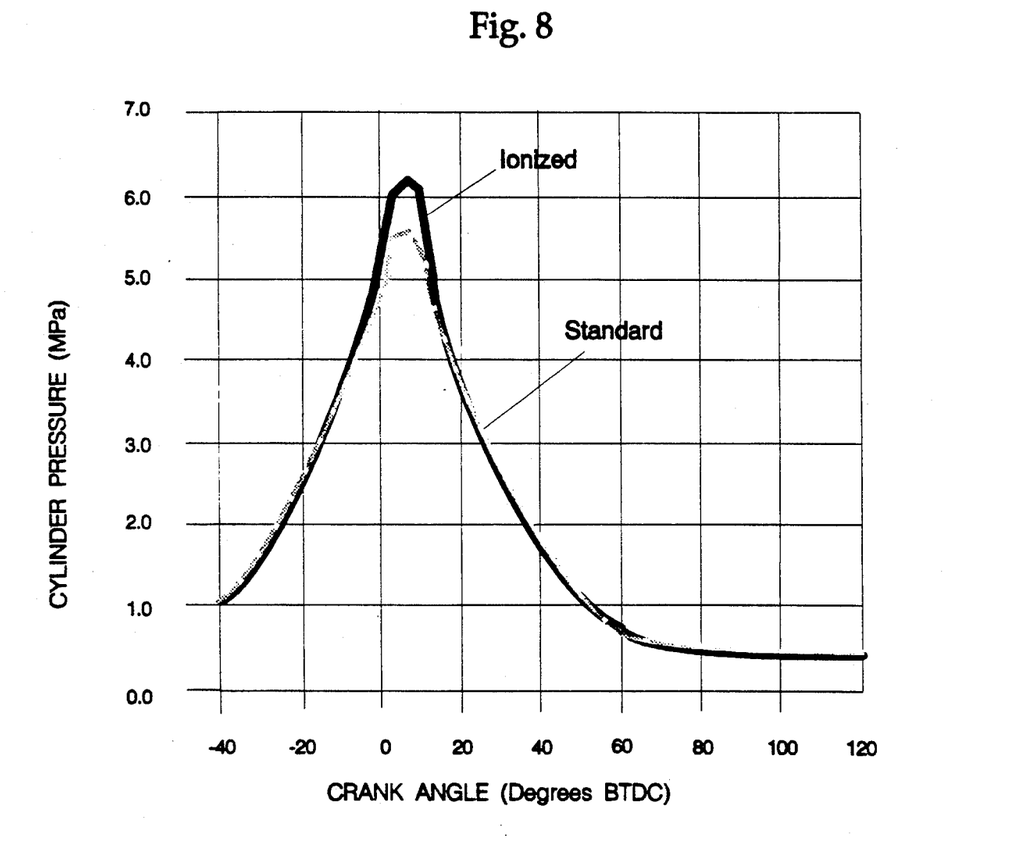
FIG. 8 is a comparative graph showing increased engine performance as represented by higher cylinder pressure using the system of the present invention.

FIG. 8 is a comparative graph showing increased engine performance using the system of the present invention. The horizontal axis represents the crank angle with zero (0) being at top dead center, and the vertical axis represents cylinder pressure in megapascals. The curves shown in FIG. 8 are illustrative of results which may be obtained using a coal and water slurry in an embodiment such as shown in FIG. 2, on a Caterpillar 1Y73 engine operating at 1,400 RPM with 6 kW output and ignition timing of 30° BTC (before top dead center). As indicated, a higher cylinder pressure, resulting in increased work by the engine, is achieved using the system of the present invention. Moreover, the peak cylinder pressure occurs at a crank angle which is closer to top dead center, thereby indicating decreased ignition delay of the fuel within combustion chamber 52.

Figure 9:
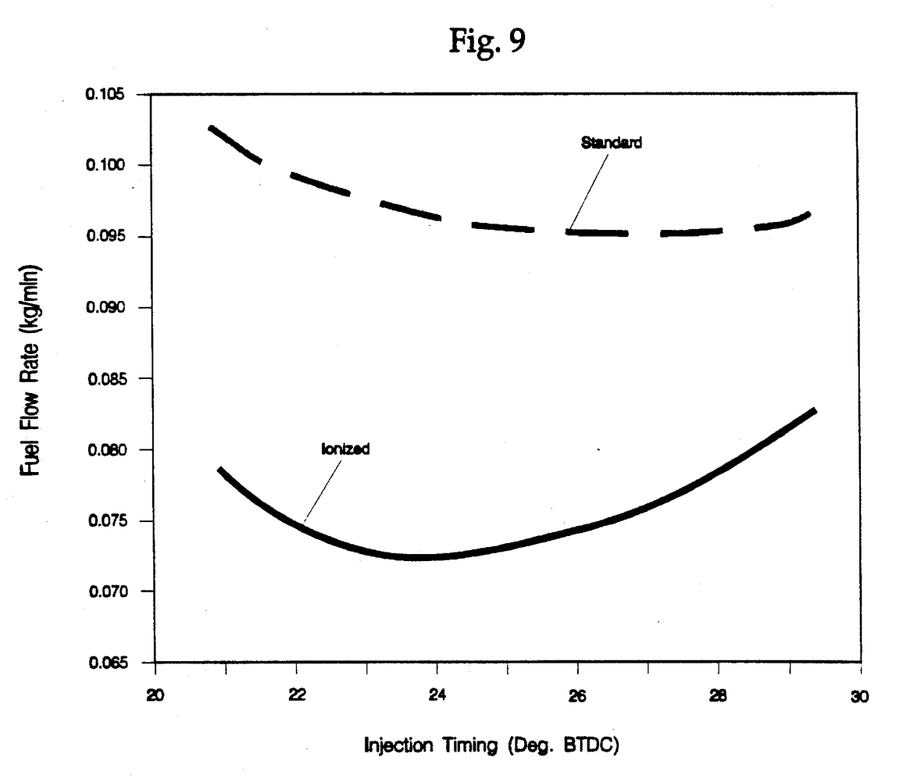
FIG. 9 is a comparative graph showing reduced fuel consumption using the system of the present invention.

FIG. 9 is a comparative graph showing decreased fuel (coal water slurry) consumption using a Caterpillar 1Y73 engine operating at 1,400 RPM and 30 ft. lb. torque, at various engine timings, for both a standard system and an ionized system of the present invention.

Figure 10:
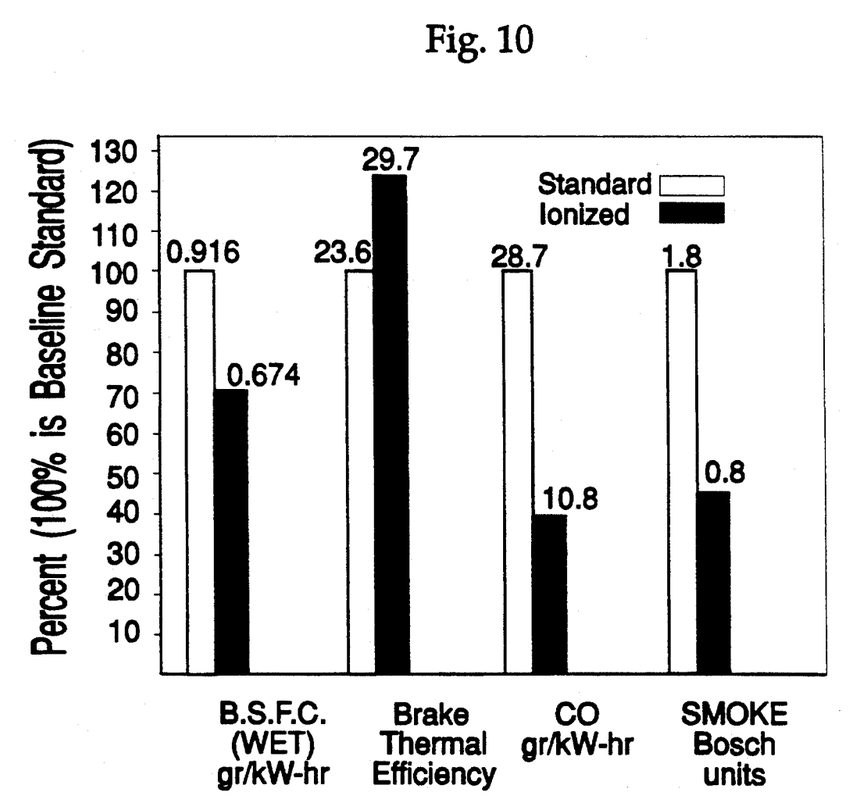
FIG. 10 is a comparative graph showing improved operating characteristics and reduced emissions using the system of the present invention.

FIG. 10 is a comparative graph showing operating characteristics and emissions using a Caterpillar 1Y73 engine on coal water slurry running at 1,400 RPM, 6 kW Output and at 23° BTDC injection timing. The 100% baseline graphs are for standard coal water slurry fuel without the invention, and the comparative graphs are for the same engine operating conditions but using the ionized system of the invention. The reductions in carbon monoxide (CO) and smoke are particularly notable.

Diesel fuel combusted with non-ionized water reduces NOX drastically. Fifty percent water content can reduce NOX by about sixty percent (60%). Coal water slurry (CWS) is already mixed with water and NOX reduction is already great compared to any fuel not having water mixed therewith. Ionized CWS as described herein increases NOX somewhat because of more efficient combustion, and higher temperature. However, the NOX emissions using CWS and the present invention is still substantially lower than using a non-water containing fuel.

While this invention has been described as having a preferred design, the present invention can be further modified within the spirit and scope of this disclosure. The terminology used in this disclosure is used for the purpose of illustration of the present invention and not for limitation. This application is therefore intended to cover any variations, uses, or adaptations of the invention using its general principals. Further, this application is intended to cover such departures from the present disclosure as come within known or customary practice in the art to which this invention pertains and which fall within the limits of the appended claims.

What is claimed is:

1. An ionic combustion system for a piston engine having a combustion chamber, comprising:
   a fuel source;
   a water source;
   an agitating chamber comprising
      a first inlet and an outlet, the first inlet adapted to receive water from a water supply,
      an agitator for agitating water in the agitating chamber, and
      at least one magnet field means adapted to ionize water in the agitating chamber; and
   wherein the combustion chamber comprises:
      inlet means in fluid communication with the agitating chamber outlet and the fuel source outlet, and
      an ignitor assist means for heating ionized water and fuel introduced from the combustion chamber inlet means.

2. The ionic combustion system of claim 1 wherein the combustion chamber further comprises a pre-chamber, and wherein the ignitor assist means is within the pre-chamber.

3. The ionic combustion system of claim 1 wherein the combustion chamber inlet means comprises:
   a first inlet in fluid communication with the agitating chamber outlet,
   a second inlet in fluid communication with the fuel source.

4. The ionic combustion system of claim 1 wherein the agitating chamber further comprises a second inlet adapted to receive fuel from the fuel source.

5. The ionic combustion system of claim 1 wherein the fuel source and water source comprise a single vessel and are communicated to the agitating chamber by the first inlet.

6. The ionic combustion system of claim 1 wherein the fuel source comprises a coal water slurry source.

7. The ionic combustion system of claim 1 wherein the fuel source comprises a gas fuel source.

8. The ionic combustion system of claim 1 wherein the fuel source comprises a solid fuel source.

9. The ionic combustion system of claim 1 wherein the agitator comprises a rotatable impeller extending into the agitating chamber.

10. The ionic combustion system of claim 1 wherein the at least one magnet field means comprises a permanent magnet.

11. The ionic combustion system of claim 1 further comprising an electro-magnet adapted to ionize the water flowing from the water source to the pre-chamber.

12. The ionic combustion system of claim 11 wherein the electro-magnet is located between the agitating chamber and the combustion chamber.

13. The ionic combustion system of claim 1 wherein the agitating chamber comprises an interior wall, and the at least one magnet field means is rigidly fixed to the interior wall of the agitating chamber.

14. A method of operating an internal combustion piston engine having a combustion chamber comprising:

providing an ionic combustion system said ionic combustion system comprising:

a fuel source;

a water source;

an agitating chamber comprising a first inlet and an outlet, the first inlet adapted to receive water from a water supply, an agitator for agitating water in the agitating chamber, and at least one magnet field means adapted to ionize water in the agitating chamber; and wherein the combustion chamber comprises:

inlet means in fluid communication with the agitating chamber outlet and fuel source outlet, and an ignitor assist means for heating ionized water and fuel introduced from the combustion chamber inlet means, introducing water into the agitating chamber, agitating the water in the agitating chamber such that the water engages a magnetic field from the magnet field means to thereby ionize the water, communicating the ionized water to the combustion chamber, communicating fuel to the combustion chamber, directing the ionized water and fuel against the ignitor assist means to thereby heat and ignite the ionized water and fuel, and combusting the ionized and heated fuel and water mixture in the combustion chamber.

15. The method of claim 14 wherein the combustion chamber further comprises a pre-chamber, and wherein the ignitor assist means are within the pre-chamber.

16. The method of claim 14 wherein the ionized water and fuel are communicated to the combustion chamber by a combined combustion chamber inlet.

17. The method of claim 14 wherein the ionized water and fuel are communicated to the combustion chamber by separate combustion chamber inlets.

18. The method claim 14 further comprising the steps of communicating fuel to the agitating chamber, and mixing the water and fuel together in the agitating chamber.

19. The method of claim 18 wherein the fuel source and water source comprise coal water slurry.

20. The method of claim 14 wherein the fuel source comprises a gas fuel source.

21. The method of claim 14 wherein the fuel source comprises a solid fuel source.

22. The method of claim 14 wherein the agitating chamber further comprises a rotatable impeller extending into the agitating chamber.

23. The method of claim 14 further comprising the step of passing the ionized water through a magnetic field when communicating it from the agitating chamber to the combustion chamber.

24. The method of claim 14 wherein at least one permanent magnet is rigidly fixed to the interior wall of the agitating chamber.

* * * * *